US009465789B1

(12) United States Patent
Chen et al.

(10) Patent No.: US 9,465,789 B1
(45) Date of Patent: Oct. 11, 2016

(54) APPARATUS AND METHOD FOR DETECTING SPAM

(71) Applicant: GOOGLE Inc., Mountain View, CA (US)

(72) Inventors: Roger Chen, Los Altos, CA (US); Kevin Thomas Frew, Santa Clara, CA (US)

(73) Assignee: GOOGLE INC., Mountain View, CA (US)

(*) Notice: Subject to any disclaimer, the term of this patent is extended or adjusted under 35 U.S.C. 154(b) by 795 days.

(21) Appl. No.: 13/851,199

(22) Filed: Mar. 27, 2013

(51) Int. Cl.
G06F 15/16 (2006.01)
G06F 17/27 (2006.01)

(52) U.S. Cl.
CPC ..................... G06F 17/27 (2013.01)

(58) Field of Classification Search
CPC ........... G06F 17/27; G06F 17/2075–17/2725; G06F 17/2745; G06F 17/276; G06Q 10/107
USPC .................................................. 709/206–207
See application file for complete search history.

(56) References Cited

U.S. PATENT DOCUMENTS

| | | | | |
|---|---|---|---|---|
| 7,546,334 B2* | 6/2009 | Redlich | ............. | G06F 17/30699 709/201 |
| 7,756,778 B1* | 7/2010 | Downey | ................. | G06Q 40/00 705/35 |
| 7,836,061 B1* | 11/2010 | Zorky | ............... | G06F 17/30707 707/749 |
| 8,010,614 B1* | 8/2011 | Musat | ................... | G06Q 10/107 709/206 |
| 2003/0126300 A1* | 7/2003 | Pickover | ............. | G06Q 10/107 719/310 |
| 2003/0131311 A1* | 7/2003 | McNamara | ......... | H04L 12/2856 714/809 |
| 2005/0076084 A1* | 4/2005 | Loughmiller | ........ | G06Q 10/107 709/206 |
| 2005/0262209 A1* | 11/2005 | Yu | .......................... | H04L 51/28 709/206 |
| 2007/0061487 A1 | 3/2007 | Moore et al. | | |
| 2007/0185963 A1* | 8/2007 | Stauffer | ............... | G06Q 10/107 709/207 |
| 2007/0204033 A1* | 8/2007 | Bookbinder | ........... | G06Q 10/10 709/224 |
| 2007/0283006 A1* | 12/2007 | Hong | ..................... | H04M 3/436 709/224 |
| 2008/0154847 A1* | 6/2008 | Chellapilla | ............. | G06Q 30/02 |
| 2008/0168144 A1* | 7/2008 | Lee | ................... | G06F 17/30707 709/206 |
| 2008/0270833 A1* | 10/2008 | McMillen | ......... | G06F 17/30985 714/32 |
| 2009/0077617 A1* | 3/2009 | Levow | .................. | H04L 12/585 726/1 |

(Continued)

FOREIGN PATENT DOCUMENTS

JP 2013012142 A * 1/2013

OTHER PUBLICATIONS en.wikipedia.org/wiki/Browser_extension; Jan. 24, 2013.

(Continued)

Primary Examiner — Alina N Boutah
(74) Attorney, Agent, or Firm — Middleton Reutlinger

(57) ABSTRACT

Provided is a process of detecting spam in websites, the process including: obtaining text from a website; detecting an amount of transitions between character sets in the text, wherein the character sets each correspond to different alphabets; calculating, with a computer, a score indicative of the likelihood that the text is spam based on the amount of transitions; and labeling the text as spam based on the score.

20 Claims, 3 Drawing Sheets

(56) References Cited

U.S. PATENT DOCUMENTS

| | | |
|---|---|---|
| 2009/0106557 A1 | 4/2009 | Leonard |
| 2009/0319274 A1 | 12/2009 | Gross |
| 2009/0319377 A1* | 12/2009 | Gazetova ............ G06Q 30/0277 705/14.73 |
| 2010/0246960 A1* | 9/2010 | Kim ..................... G06K 9/0057 382/176 |
| 2012/0131150 A1* | 5/2012 | Jeong .................. G06F 15/0291 709/219 |
| 2012/0210420 A1* | 8/2012 | Rybalko ................ H04L 51/12 726/22 |
| 2012/0227104 A1* | 9/2012 | Sinha ................... H04L 12/585 726/22 |
| 2012/0254184 A1 | 10/2012 | Choudhary et al. |
| 2012/0278341 A1 | 11/2012 | Ogilvy et al. |
| 2013/0022280 A1 | 1/2013 | Liu et al. |
| 2013/0132093 A1 | 5/2013 | Gross |
| 2013/0191469 A1* | 7/2013 | Dichiu ................ H04L 63/0263 709/206 |

OTHER PUBLICATIONS en.wikipedia.org/wiki/IDN_homograph_attack; Jan. 24, 2013.

* cited by examiner

APPARATUS AND METHOD FOR DETECTING SPAM

BACKGROUND OF THE INVENTION

1. Field of the Invention

The present invention relates generally to the classification of text on the Internet and, more specifically, to the detection of spam.

2. Description of the Related Art

Content available on the Internet has varying degrees of reliability and relevance to users. Organizing this information is relatively challenging, as an enormous amount of content is published on websites, with new content being published at a very high rate. Faced with this volume of information, users have increasingly come to use services, such as search engines and content aggregators that classify content. Included in such classification is detecting and filtering spam appearing in websites, user comments, and business listings. To detect spam, these services often examine content for certain strings of characters known to correlate with spam, designating, for instance, a website with the text "cheap prescription drugs" as likely spam designed to fill search engine results with content of low relevance to users.

In response to these keyword-detection techniques, spammers have modified their approach. Some spammers publish text designed to convey different messages to a human reader and a computer by exploiting similar appearing characters in different character sets, for example, by relying on letters in the Greek or Cyrillic alphabets that appear similar to those used in the Latin alphabet. By replacing Latin characters with similar appearing Greek or Cyrillic characters, the spammer creates text that conveys the intended message to a human being, while failing to match the text patterns by which spam is detected. Thus, a spammer might convey the message that their website has cheap prescription drugs by replacing the Latin "a" in the word "cheap" with a Cyrillic letter "a," which will cause the text to not match to a regular expression designed to match the word "cheap."

SUMMARY

The following is a non-exhaustive listing of some aspects of the present techniques. These and other aspects are described in the following disclosure.

Some aspects include a process of detecting spam in websites, the process including: obtaining text from a website; detecting an amount of transitions between character sets in the text, wherein the character sets each correspond to different alphabets; calculating, with a computer, a score indicative of the likelihood that the text is spam based on the amount of transitions; and labeling the text as spam based on the score.

Some aspects include a tangible, non-transitory, machine-readable medium storing instructions that when executed by a data processing apparatus cause the data processing apparatus to perform operations, including: obtaining text from a website; detecting an amount of transitions between character sets in the text, wherein the character sets each correspond to different alphabets; calculating, with a computer, a score indicative of the likelihood that the text is spam based on the amount of transitions; and labeling the text as spam based on the score.

Some aspects include a system, including one or more processors, and memory storing instructions that when executed by the processors cause the processors to effectuate operations including: obtaining text from a website; detecting an amount of transitions between character sets in the text, wherein the character sets each correspond to different alphabets; calculating a score indicative of the likelihood that the text is spam based on the amount of transitions; and labeling the text as spam based on the score.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
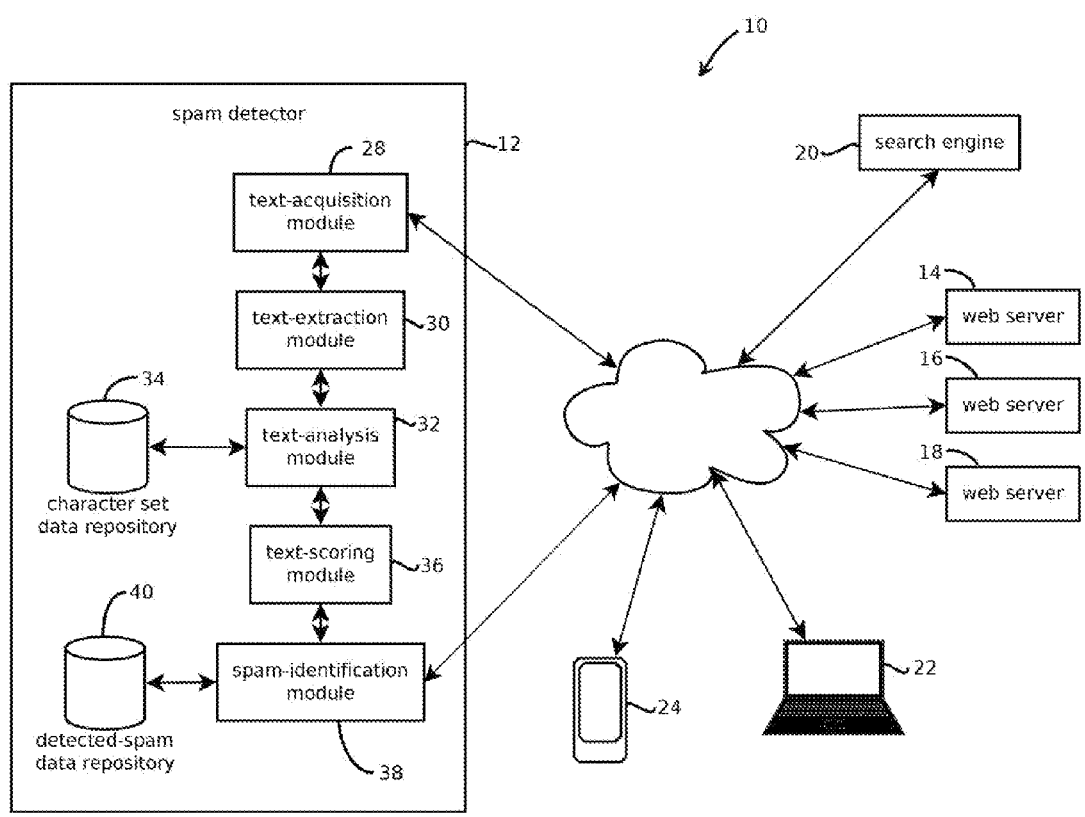
FIG. 1 shows an example of a spam detector in accordance with some embodiments and the environment in which the spam detector operates.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

As noted above, spammers have adapted to certain techniques used in the detection of spam in websites, e.g., in user reviews, websites being ranked by a search engine, or entries in a business listing. Specifically, some spammers have begun exploiting the similar appearance of characters in different alphabets, thereby potentially distinguishing their spam text from regular expressions designed to detect the presence of certain messages in the text, while still conveying the suspect message to the human user. This problem is mitigated by some embodiments in accordance with FIG. 1, which shows a computing environment 10 in which a spam detector 12 operates to detect the use of this technique by spammers.

In some embodiments, the spam detector 12 detects spam based on transitions between character sets. Such embodiments determine whether the text contains a relatively high number of transitions between character sets, e.g., from the Latin character set to the Greek character set and back. Text determined to have a relatively high number of such transitions is labeled as spam and is removed from the website or is ranked lower in search results. Further, to account for text from different authors on a single webpage, e.g., in user reviews in which only some of the reviews are spam, an embodiment isolates text from each author on a webpage and, then, independently analyzes text from the different authors.

For instance, in the scenario above in which the word "cheap" is modified to include a Cyrillic "a," the phrase "cheap prescription drugs" includes two transitions: one from the Latin character set by which the letters "che" are expressed to the Cyrillic character set for the letter "a"; and one from the Cyrillic character set back to the Latin character set by which the remainder of the phrase "p prescription drugs" is expressed. Thus, a single character swap accounts for two transitions in this example.

Because spammers often do not know which pattern is being detected to identify spam, their spam text often includes several such character replacements interspersed throughout the text, yielding a relatively high number of transitions for a given body of text. In contrast, legitimate uses of other character sets, for example to block quote a paragraph in another language, tend to yield relatively few transitions, as entire words or phrases are generally expressed in the differing character set. Thus, some embodiments are expected to yield relatively few false positives when detecting spam. Further, some embodiments further improve accuracy by weighting transitions to characters known to be misleading and adjusting thresholds based on language and the type of website from which the text was obtained.

In this embodiment, the computing environment 10 includes the spam detector 12, Web servers 14, 16, and 18, a search engine 20, user devices 22 and 24, and the Internet 26. These components 14, 16, 18, 20, 22, and 24 communicate with one another via the Internet 26 and various other networks, such as local area networks, cellular networks, and the like. Web servers 14, 16, and 18 each serve webpages. The webpages themselves may constitute spam, for example, misleading webpages of little relevance to users searching for a given keyword but designed to rank high in a search algorithm based on that keyword. Or the webpages may contain user entered content—such as comments, reviews, and user-entered business listings—that constitute spam in an otherwise legitimate webpage. Accordingly, some embodiments group and analyze the text on the webpages by author, labeling, for example, some entire websites or webpages as spam, or in some cases, a subset of the reviews or other user entered text on a webpage as spam. The user devices 22 and 24 have web browsers or special-purpose applications for requesting, interacting with, and displaying content from the Web servers 14, 16, and 18. Further, in some cases, user devices 22 or 24 are used to provide user-entered content to the web servers 14, 16, or 18.

The search engine 20 is operative to receive queries from user devices 22 and 24 and, in response, rank search results linking to content from the web servers 14, 16, and 18. In some embodiments, the search engine 20 further includes content extracted from webpages from the web servers 14, 16, and 18, for instance, summaries of reviews hosted on the web servers 14, 16, and 18, or business listings created by automatically extracting parameters of a business (e.g., operating hours, location, type of business, and the like) from webpages about the business hosted by the web servers 14, 16, or 18. In either case, the presence of spam on a new webpage is relevant to the operation of the search engine 20, either for down-ranking or excluding spamming websites or excluding spam from content extracted from a website.

In some cases, the spam detector 12 is operated by the same entity that operates one of the web servers 14, 16, or 18 to identify and remove spam entered by users of the respective website, or in other use cases, the spam detector 12 is operated by a third-party, such as the entity operating the search engine 20, to rank, filter, or otherwise analyze web content from the web servers 14, 16, or 18 based on the presence of spam on their respective websites.

In this embodiment, the spam detector 12 includes a text-acquisition module 28, a text-extraction module 30, a text-analysis module 32, a character set data repository 34, a text-scoring module 36, a spam-identification module 38, and a detected-spam data repository 40. These components communicate with one another to identify webpages or portions of webpages that are likely spam based on the amount of transitions between character sets in the webpage text.

Character sets are part of a character encoding, which maps letters of one or more alphabets and other text characters, such as whitespace and punctuation, to binary numbers, often of a fixed length, called code units. These binary numbers are generally used for storing, exchanging, manipulating, and analyzing the corresponding characters with a computer. For example, the American Standard Code for Information Interchange (ASCII) character encoding maps each character of the Latin alphabet and set of Arabic numbers to a different seven-bit number. More comprehensive character encodings include codes corresponding to alphabets and numbering systems of most commonly used human languages. Examples of such character encodings include the UTF-16 (16-bit Unicode Transformation Format) character encoding, the UTF-32 character encoding (or 32-bit UTF encoding), and other character encodings described by the Unicode standard, such as UTF-8, USC-2, and the like.

The term "character set," as used herein, refers to a subset of a character encoding appropriate for a given alphabet. For instance, in the UTF-16 character encoding, the Latin character set includes the range of binary digits "feff0041" (expressed in hexadecimal) through "feff005a," which are mapped to the Latin capital letters "A" through "Z," and the range "feff0061" through "feff007a," which are mapped to the Latin small letters "a" through "z." In UTF-16, the Latin character set also has encodings for non-alphabetic characters, including numerical digits, punctuation, and whitespace. In some instances, character sets overlap, sharing, for example, encoding values for whitespace characters, punctuation, and numerical digits across multiple alphabets. So, for example, whitespace characters occurring between Greek words do not constitute a transition between character sets even though such whitespace characters are also part of the Latin character set, as the alternative would likely generate false positives for text primarily in non-Latin alphabets.

Text obtained by the text-acquisition module 28 of FIG. 1 is encoded in one or more character sets. In some embodiments, the text is acquired from a variety of different sources, depending on the application. In some cases, text is submitted to the spam detector 12 for classification via an application program interface (API), for example by an operator of one of the web servers 14, 16, or 18 to determine whether a user-provided review is spam before publishing the review. Or the text-acquisition module 28 may crawl the web to obtain text for classification or receive such text from the search engine 20 as the search engine 20 crawls the web. In some cases, the acquired text is source code by which a web browser is instructed to render a webpage, including for example scripting, markup, and styling code, along with visible text to be presented to the user in the rendered webpage, or the acquired text is solely text for presentation to a user, e.g., text submitted via an API. Upon acquiring the text, in some embodiments, the text-acquisition module 28 is configured to detect whether the acquired text is encoded in, for example, UTF-8, UTF-16, ISO-8859-1, or ASCII. To this end, in some embodiments, the text-acquisition module 28 parses from the text an explicit identifier of the encoding, e.g., by identifying the "charset" attribute in a "meta" tag in hypertext markup language (HTML). Alternatively, the text-acquisition module 28 may assume a default character encoding or infer a character encoding. In some embodiments, the text-acquisition module 28 outputs the acquired text, such as the text of a single webpage, and an associated character encoding for subsequent analysis.

In some embodiments, the text-extraction module 30 segments the received text, e.g., by author in cases in which the webpage contains text from multiple authors. Segmentable text, such as text from different authors can be detected based on markup data and patterns in the webpage. For example, different user reviews are often associated with different elements of a document object model of the webpage, e.g., in different div boxes, and different user reviews are often separated from one another by periodically occurring elements, such as dates or interfaces by which other users up vote or down vote the comment. Similarly, user reviews are often preceded by the term "comments" or "reviews" in a webpage. Using these or similar patterns, text from different segments, such as text from different authors is identified as distinct text entries within the received text. Or, in some cases, the entire body of text of the webpage is identified as a single text entry from a single author, for example, when detecting whether an entire website or webpage constitutes spam.

In some cases, the received text is associated with a webpage type, indicating whether the text is a likely user review, a business listing, or a webpage of some other sort. The webpage type is used to adjust subsequently used thresholds, as further explained below. Webpage type is, in some cases, expressly associated with the text by a request to categorize the webpage, or the type is inferred from keywords in the page corresponding to each type. As noted above, some websites may have multiple sections of text, for example, text from the author of the webpage and text from authors of user reviews. In such cases, each extracted text segment is associated with a webpage portion type, indicating, for example, whether the text corresponds to a user review, a business description, or some other portion of the webpage. The portion type is also used to adjust various thresholds for identifying spam based on where within the webpage the text was found.

The extracted text entries and associated data (e.g., webpage portion type), are provided to the text analysis module 32 for quantitative analysis based on the character sets used in the text. For each extracted text entry (e.g., a webpage or a portion thereof), the text-analysis module 32 determines a number or rate of transitions between character sets in the text. To this end, some embodiments retrieve character set records from the character set data repository 34 based on the character encoding associated with the text entry. A single character encoding generally has multiple character set records. The character set records each identify a set of character encoding values corresponding to a given character set. For instance, in the character set records for the UTF-16 encoding, one character set record identifies the set of values corresponding to the Latin character set, another character set record identifies the set of values corresponding to the Greek character set, another character set record identifies the set of values for the Hebrew character set, and the like. In some cases, the character set records are defined by a range of encoding values between minimum and maximum encoding values for the characters in the set. Alternatively, the character set records may be an unordered (or ordered, for faster classification) list of binary numbers encoding the characters in the character set.

The illustrated text-analysis module 32 is operative to identify transitions between character sets in each text entry based on the character set records. The module 32, in some embodiments, iterates through each character in the sequence of characters constituting the text entry, and determines whether the encoding value for that character corresponds to the same character set as the encoding value for the previous character in the text entry. Upon determining that the encoding for a given character in the text represents a transition between character sets, a transition counter is incremented to generate an aggregate transition count for the text entry. To normalize or determine the rate of transitions, a character counter is incremented for each character in the text entry. Other embodiments apply a functional approach to quantifying transitions by mapping overlapping pairs of characters to a function that returns a zero if the characters are encoded in the same character set and a one if the characters are encoded in different character sets, and summing the returned values. In some cases, to simplify the analysis, the character set record merely specifies a single character set, such as the Latin character set, and any transition to an encoding higher than a maximum value or lower than a minimum value of the Latin character set, regardless of which other character set corresponds to the encoding, constitutes a transition.

In some cases, a character set maps characters to a range of encoding values defined by a minimum encoding value and a maximum encoding value, and transitions to or from that character set are detected by determining whether a character is encoded by a value that is greater than the maximum or less than the minimum, rather than by comparing each character in question to a full set of encoding values until a match is found or an absence of a match is confirmed. Or in some embodiments, for encodings in which the Latin character set is continuous and begins with an encoding of zero, transitions to and from characters encoded in the Latin character set are detected with reference to the maximum for the range of Latin encoding values, thereby simplifying the detection of transitions to comparison of a character encoding value with a single threshold value, the maximum Latin encoding value, potentially expediting operation for text entries that are primarily encoded in the Latin character set.

As noted above, counting transitions between characters, rather than merely counting the number of non-Latin characters, is expected to yield relatively few false positives. Some entries of legitimate, non-spam text include full words or phrases expressed in another language and character set. Such an entry would tend to produce a high count of non-Latin characters in a body of text otherwise written in Latin characters, yielding a spam-like signal. But in the present embodiment, because such words or phrases in legitimate multi-lingual entries include a consecutive collection of characters in the other, non-Latin set, the transition count is relatively low compared to spam in which the encoding of individual characters are swapped between different character sets. That said, embodiments are also consistent with the detection of spam based on a count of non-Latin characters in a body of text.

For each text entry, the text-analysis module 32 associates with the text entry a transition count and a character count, and the text entry and associated data are advanced to the text-scoring module 36, which is operative to calculate a score for the text entry indicative of the likelihood that the text entry is spam. In some embodiments, the text-scoring module 36 divides the number of transitions by the total number of characters in the text entry to calculate the score as a transition ratio. Normalizing the score based on the total number of characters is expected to account for the tendency of larger bodies of text to have more legitimate transitions between character sets, thereby reducing the risk of false positives in larger bodies of text.

Some embodiments also account for the number of languages occurring in the text entry to reduce further the risk of false positives when foreign language words or phrases occur in the text. To this end, the text entry is submitted, in some embodiments, to a language detector operative to classify words or phrases according to language and return the number of languages used in the text entry. The ratio of transitions to characters is then multiplied by the number of languages to calculate the score. Some forms of spam tend to use more languages than legitimate text.

In some languages, such as Polish, it is relatively common to include characters of multiple character sets. To accommodate these languages, some embodiments apply a language-specific approach to calculating the score. In these embodiments, the text entry is submitted to the language detector to identify a primary language, corresponding to the language that accounts for the most words in the text, or to identify a primary character set encoding the most characters in the text. Based on the primary language or primary character set, a corresponding record of misleading characters for that language or set is retrieved from the character set data repository. Each language or character set, in this embodiment, is associated with a record of misleading characters. The record of misleading characters identifies characters from foreign character sets that appear similar to characters in the primary character set to a human reader. In some cases, misleading characters are associated with a weighting indicative of the degree to which the characters are misleading (i.e., visually similar to a character in the primary character set), as measured by empirical testing. In some embodiments, transitions between character sets are weighted based on similarities between character sets. For example, a greater weight is given to a transition to or from a misleading character identified in the misleading character records. In some cases, this weighting is character-specific, so that transitions to or from particular characters in the misleading character record are more heavily weighted. Accordingly, transitions to characters in other character sets that are misleading to the human eye score higher than transitions to characters in other character sets that are not misleading to the human eye (e.g., that do not look like characters in the primary language or character set).

The resulting score, in some embodiments, is output to the spam-identification module 38, which determines whether the text entry is likely spam based on the score. In some cases, the text is labeled as spam in response to the score exceeding a threshold. In some embodiments, the threshold is adjusted upward based on the primary language or primary character set to account for the tendency of some languages or character sets to use foreign characters more frequently. In some embodiments, the threshold is adjusted downward based on the type of webpage or portion of the webpage from which the text was obtained to account for the tendency of spammers to spam certain types of webpages or certain portions of webpages. For example, the threshold for a business listing, which tends to draw the attention of spammers, is lower than the threshold for the text of user reviews. The threshold, in some embodiments, is also adjusted upward based on the number of characters in the text to reduce the risk of false positives with small sample sizes.

In the illustrated embodiment, text entries identified as spam are recorded in the detected-spam data repository 40. Such entries include a record identifying the webpage, such as a URL, a date upon which the webpage text was obtained, and an indicator of the score. In some embodiments, a text entry labeled as spam is added to a work list, stored in memory, for subsequent review by a human to confirm that the designation is correct. The work list, in some cases, is ranked according to the score, placing entries more likely to be spam higher in the work list. In some embodiments, the human reviewer views the text in a web browser with a plug-in operable to modify the presentation of foreign character sets, i.e., character sets outside those of the primary character set of the text. For instance, the browser plug-in of some embodiments increases the visual weight of the members of foreign character sets by highlighting the corresponding characters to facilitate relatively quick review by the human reviewing the text. In such embodiments, the final determination of the human reviewer (spam or likelihood of spam) is stored in the detected-spam data repository 40.

In some cases, the identified spam is reported to the search engine 20, and in response, the search engine 20 disregards the corresponding text or down weights a website associated with the corresponding text. Or in embodiments in which the text is submitted to the spam detector 12 by one of the web servers 14, 16, or 18 for classification, the spam-identification module 38 returns a value indicating whether the submitted text is labeled as spam, so that the corresponding web server 14, 16, or 18 can remove the text from a published website or decline to publish the text.

Thus, embodiments of the spam detector 12 detect the use of foreign character sets in spam to conceal the spam from conventional text-based pattern recognition spam detection algorithms. Embodiments are expected to achieve a relatively low false-positive rate by accounting for the number of characters in the text, the source of the text, the position of the text in the corresponding webpage, and whether the characters are known to be misleading. Performing this process automatically, with a computer system, such as those described below with reference to FIG. 3, is expected to yield relatively low-cost, and relatively fast classification of text as spam, facilitating the presentation of high-relevance content to users.

The components of the spam detector 12 are illustrated as discrete-functional blocks, but it should be noted that the hardware and software by which the corresponding functionality is implemented may be organized differently, for example, such software or hardware may be intermingled, subdivided, conjoined, distributed, or otherwise differently arranged. Further, such software may be stored on a tangible, non-transitory, machine-readable memory such that when the software is executed by a data processing apparatus, the data processing apparatus provides the functionality described herein.

Figure 2:
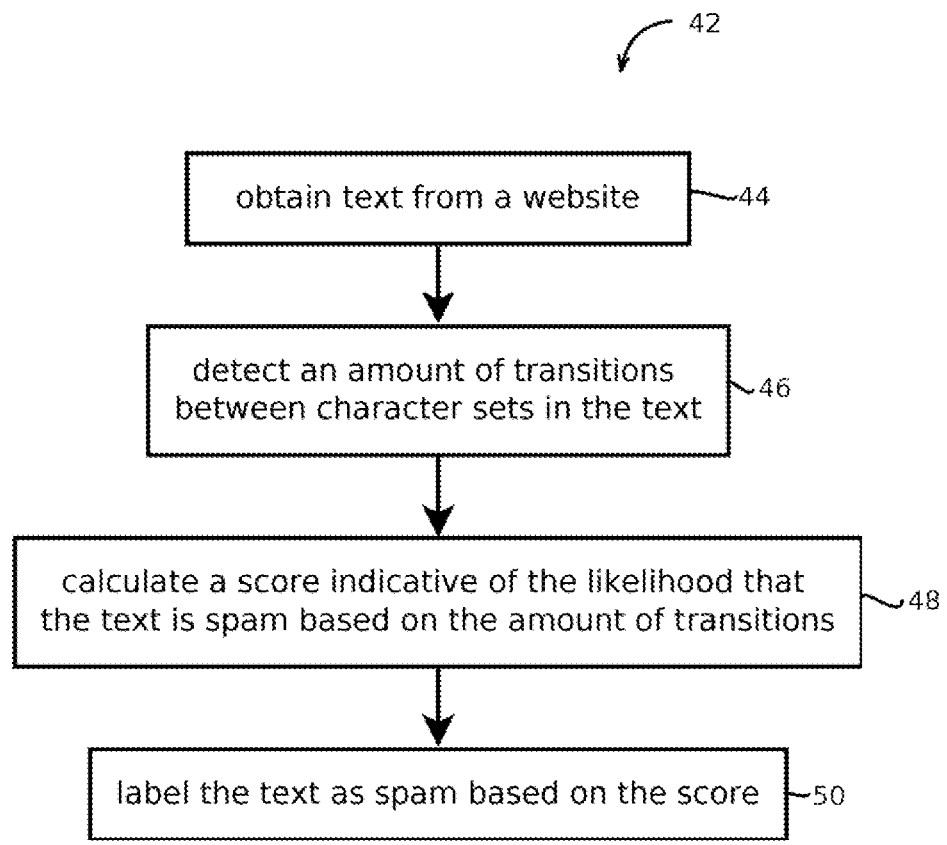
FIG. 2 shows an example of a process for detecting spam in accordance with some embodiments.

FIG. 2 illustrates an embodiment of a process for detecting spam 42, which in some cases is performed by the above-described spam detector 12, but is not limited to the particular arrangement described above. In this embodiment, the process 42 includes obtaining text from a website, as illustrated by block 44. Obtaining text is performed by the above-described text-acquisition module 28 and, in some cases, the text-extraction module 30, depending upon the processing steps with which the text is obtained. The process 42 of this embodiment further includes detecting an amount of transitions between character sets in the text, as illustrated by block 46. This step is performed by the above-described text-analysis module 32. Next, the process 42 of this embodiment includes calculating a score indicative of the likelihood that the text is spam based on the amount of transitions, as illustrated by block 48. This step is performed by the above-described text-scoring module 36. Finally, in this embodiment, the process 42 includes labeling the text as spam based on the score, as illustrated by block 50. This step is performed by the above-described spam-identification module 38. As with the system of FIG. 1, the process 42 of FIG. 2 labels text as spam based on the use of various character sets within the text, thereby providing some or all of the above-described benefits of the spam detector 12.

Figure 3:
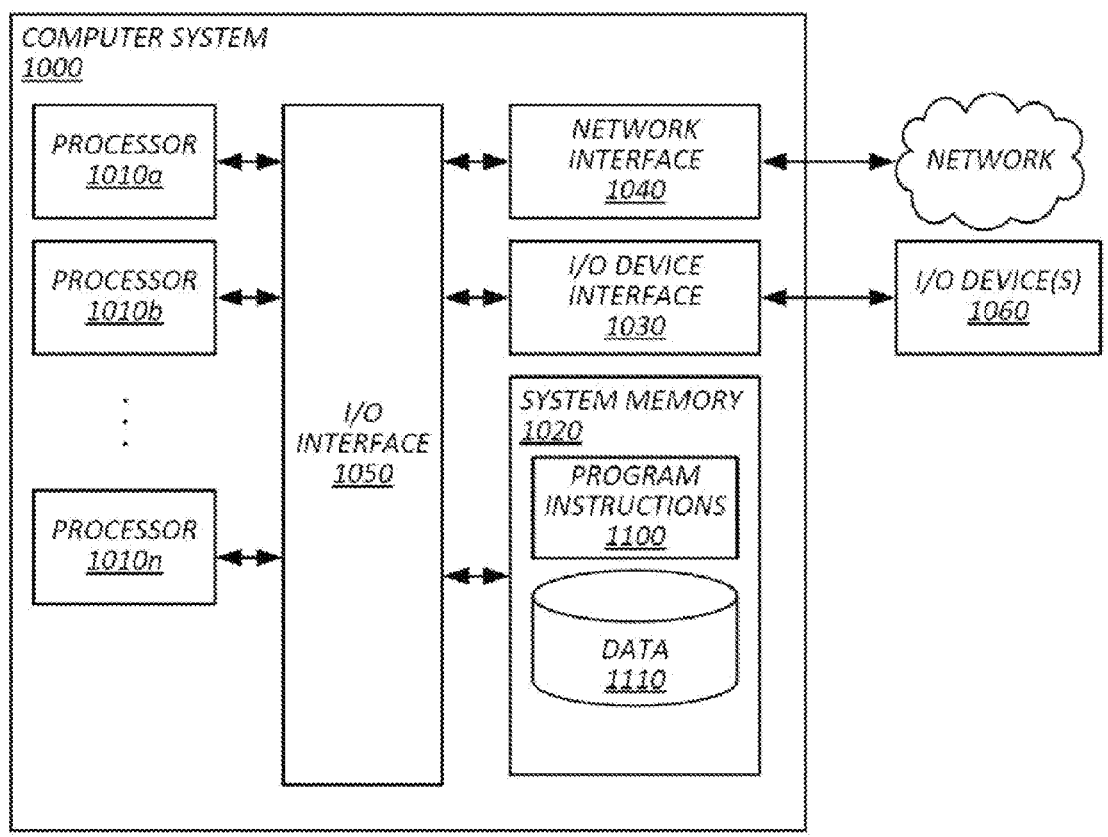
FIG. 3 shows an example of a computer system by which the above-described embodiments are implemented.

FIG. 3 is a diagram that illustrates an exemplary computing system 1000 in accordance with embodiments of the present technique. Various portions of systems and methods described herein may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010*a*-1010*n*) to cause the subject matter and the functional operations described herein. A memory (e.g., system memory 1020) may include a single memory device and/or a plurality of memory devices (e.g., distributed memory devices). In some embodiments, the program may be conveyed by a propagated signal, such as a carrier wave or digital signal conveying a stream of packets.

I/O interface 1050 may be configured to coordinate I/O traffic between processors 1010*a*-1010*n*, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," and "includes," and the like, mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y," "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing," "computing," "calculating," "determining," or the like, refer to actions or processes of a specific apparatus, such as a special purpose computer or a similar special purpose electronic processing/computing device. In the context of this specification, a special purpose computer or a similar special purpose electronic processing or computing device is capable of manipulating or transforming signals, for instance signals represented as physical electronic, optical, or magnetic quantities within memories, registers, or other information storage devices, transmission devices, or display devices of the special purpose computer or similar special purpose processing or computing device.

What is claimed is:

1. A method of detecting spam in web sites, the method comprising:
   obtaining a text entry;
   detecting a number of character transitions between character sets in the text entry, wherein the character sets (i) each correspond to different alphabets and (ii) are different subsets of a character encoding that maps characters from multiple alphabets to respective binary numbers for use by computers;

calculating, with a computer, a score indicative of the likelihood that the text entry is spam based on the number of character transitions; and labeling the text entry as spam based on the score.

2. The method of claim 1, wherein the score is based on the ratio of the number of character transitions between character sets and a number of characters in the text entry.

3. The method of claim 1, wherein detecting a number of character transitions between character sets in the text entry further comprises:

identifying a primary character set of characters in the text entry;

selecting a record of misleading characters corresponding to the primary character set, wherein a misleading character in a non-primary character set is visually similar to a character in the primary character set; and weighting a count of the number of character transitions to or from characters in the record of misleading characters more than a count of the number of character transitions to or from characters that are not in the record of misleading characters.

4. The method of claim 1, wherein obtaining a text entry further comprises:

receiving a text and segmenting the text into a plurality of text entries.

5. The method of claim 4, wherein the plurality of text entries are reviews on a website having a plurality of user-provided reviews.

6. The method of claim 1, wherein detecting a number of character transitions between character sets in the text entry comprises:

obtaining from memory the subsets of the character encoding;

determining that a character in the text entry is encoded with a different subset of the character encoding than a previous character in the text entry; and incrementing a transition count for the number of character transitions between character sets in the text entry.

7. The method of claim 6, wherein each subset of the character encoding specifies a range of values corresponding to an alphabet, and wherein determining that a character in the text entry is encoded with a different subset of the character encoding than a previous character in the text entry comprises determining that the character is encoded with a value that is outside the range of values corresponding to the subset of the character encoding with which the previous character was encoded.

8. The method of claim 1, wherein labeling the text entry as spam based on the score comprises adding the text entry to a set of suspicious texts for human review to confirm the spam labeling.

9. The method of claim 8, further comprising rendering the text entry and augmenting the display of the text entry to highlight transitions between character sets.

10. The method of claim 1, wherein obtaining a text entry comprises:

isolating visible text from a webpage to remove markup and scripting commands.

11. The method of claim 1, wherein calculating a score indicative of the likelihood that the text entry is spam based on the number of character transitions further comprises:

determining a number of languages in the text entry;

determining a ratio of the number of character transitions between character sets in the text entry and a number of characters in the text entry; and multiplying the ratio by the number of languages to calculate the score.

12. The method of claim 1, comprising:

ranking the text entry relative to other text entries by down-ranking the text entry responsive to labeling the text entry as spam.

13. The method of claim 1, wherein labeling the text entry as spam based on the score further comprises:

identifying a primary character set in the text entry;

selecting a threshold based on the primary character set; and determining that the score exceeds the threshold.

14. The method of claim 1, wherein labeling the text entry as spam based on the score further comprises:

determining that the text entry came from a particular website or portion of a website;

selecting a threshold based on the particular website or portion of the website; and determining that the score exceeds the threshold.

15. The method of claim 14, wherein a threshold for text entries corresponding to a portion of a website containing business listings is lower than a threshold for text entries corresponding to a portion of a website corresponding to user reviews.

16. The method of claim 3, wherein a count of the number of character transitions between at least some Greek or Cyrillic characters and Latin characters are given greater weight than a count of the number of character transitions between characters encoded in other character sets.

17. The method of claim 1, wherein the character sets share at least some characters including at least some whitespace characters.

18. The method of claim 10, further comprising automatically removing the text entry from the webpage in response to labeling the text entry as spam.

19. A tangible, non-transitory, machine-readable medium storing instructions that when executed by a data processing apparatus cause the data processing apparatus to perform operations comprising:

obtaining a text entry;

detecting a number of character transitions between character sets in the text, wherein the character sets (i) each correspond to different alphabets and (ii) are different subsets of a character encoding that maps characters from multiple alphabets to respective binary numbers for use by computers;

calculating, with a computer, a score indicative of the likelihood that the text entry is spam based on the number of character transitions; and labeling the text entry as spam based on the score.

20. A system, comprising:

one or more processors; and memory storing instructions that when executed by the processors cause the processors to effectuate operations comprising:

obtaining a text entry;

detecting a number of character transitions between character sets in the text, wherein the character sets (i) each correspond to different alphabets and (ii) are different subsets of a character encoding that maps characters from multiple alphabets to respective binary numbers for use by computers;

calculating, with a computer, a score indicative of the likelihood that the text entry is spam based on the number of character transitions; and labeling the text entry as spam based on the score.

* * * * *